(12) United States Patent
Sommerville (10) Patent No.: US 9,044,857 B2
(45) Date of Patent: Jun. 2, 2015

(54) CONTROL SYSTEM THAT GUIDES A ROBOT OR ARTICULATED DEVICE WITH A LASER DISTANCE METER FOR 3D MOTION, OR GUIDES A ROBOT OR ARTICULATED DEVICE WITH A COMPUTER POINTING DEVICE (SUCH AS A MOUSE) FOR 2D MOTION

(71) Applicant: Jerry Neal Sommerville, Rancho Cucamonga, CA (US)

(72) Inventor: Jerry Neal Sommerville, Rancho Cucamonga, CA (US)

( * ) Notice: Subject to any disclaimer, the term of this patent is extended or adjusted under 35 U.S.C. 154(b) by 183 days.

(21) Appl. No.: 13/712,844

(22) Filed: Dec. 12, 2012

(65) Prior Publication Data

US 2013/0211597 A1 Aug. 15, 2013

Related U.S. Application Data

(60) Provisional application No. 61/598,759, filed on Feb. 14, 2012.

(51) Int. Cl.
*B25J 9/16* (2006.01)

(52) U.S. Cl.
CPC .............. *B25J 9/1602* (2013.01); *Y10S 901/02* (2013.01); *B25J 9/1671* (2013.01); *B25J 9/1697* (2013.01); *G05B 2219/39387* (2013.01); *G05B 2219/40099* (2013.01); *G05B 2219/40103* (2013.01)

(58) Field of Classification Search
CPC .... B25J 9/1689; B25J 17/0266; B25J 19/023; B25J 9/0057; B25J 9/0066; B25J 9/1664; B25J 9/1602; B25J 9/1697; G05B 2219/39414; G05B 2219/39422; G05B 2219/40122; G05B 2219/37275; G05B 2219/39033

See application file for complete search history.

(56) References Cited

U.S. PATENT DOCUMENTS

| | | | |
|---|---|---|---|
| 5,182,641 A | 1/1993 | Diner | |
| 5,318,254 A | 6/1994 | Shaw et al. | |
| 5,430,643 A | 7/1995 | Seraji | |
| 5,490,646 A | 2/1996 | Shaw et al. | |
| 5,737,500 A | 4/1998 | Seraji | |
| 5,784,542 A | 7/1998 | Ohm et al. | |
| 5,809,099 A * | 9/1998 | Kim et al. | 376/249 |
| 6,181,983 B1 * | 1/2001 | Schlemmer et al. | 700/245 |
| 7,930,067 B2 * | 4/2011 | Miyamoto et al. | 700/264 |
| 8,002,694 B2 * | 8/2011 | Kishi et al. | 600/103 |
| 8,155,787 B2 | 4/2012 | Chalubert et al. | |
| 2001/0002098 A1 * | 5/2001 | Haanpaa et al. | 318/568.11 |
| 2008/0140087 A1 * | 6/2008 | Barbagli | 606/130 |
| 2008/0312770 A1 * | 12/2008 | Alvarez et al. | 700/251 |
| 2009/0190826 A1 * | 7/2009 | Tate et al. | 382/153 |
| 2009/0289591 A1 | 11/2009 | Kassow et al. | |
| 2010/0152899 A1 * | 6/2010 | Chang et al. | 700/262 |
| 2010/0286826 A1 | 11/2010 | Tsusaka et al. | |
| 2011/0022229 A1 | 1/2011 | Jang et al. | |
| 2012/0210817 A1 | 8/2012 | Kassow et al. | |

* cited by examiner

*Primary Examiner* — Bao Long T Nguyen
(74) *Attorney, Agent, or Firm* — Kirk A. Buhler; Buhler & Associates (57) ABSTRACT

A control system that guides a robot or articulated device with a laser distance meter for 3D motion, or guides a robot or articulated device with a computer pointing device (such as a mouse) for 2D or 3D motion. User needs to point to a desired physical location of the end point, and then the difficult work of finding the right joint angles to get there is done by a computer. System works like hand eye coordination. The hand goes wherever the eye is pointed so long as the eye is pointed within the reachable boundary of the jointed arm or articulated device.

20 Claims, 7 Drawing Sheets

FIG. 7

# CONTROL SYSTEM THAT GUIDES A ROBOT OR ARTICULATED DEVICE WITH A LASER DISTANCE METER FOR 3D MOTION, OR GUIDES A ROBOT OR ARTICULATED DEVICE WITH A COMPUTER POINTING DEVICE (SUCH AS A MOUSE) FOR 2D MOTION

CROSS REFERENCE TO RELATED APPLICATION

This application claims the benefit of Provisional Application Ser. No. 61/598,759 filed Feb. 14, 2012 the entire contents of which is hereby expressly incorporated by reference herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

This invention relates generally to a program that an apparatus and software for controlling a robotic arm and other articulated devices. More specifically the invention uses an input device such as a mouse, stylus, trackball, other guiding device to direct a robotic device, such as an arm, using the movement and or motion of the input device.

2. Description of Related Art Including Information Disclosed Under 37 CFR 1.97 and 1.98

Robot arms were developed to perform either repeatable operation where they must follow the same direction of travel and perform the same operation in a nearly infinite loop. The arm does not become tired or fatigued from the constant repetition. Another reason for using a robotic arm is because the arm can be programmed to perform detailed precision. The precision can be from placing electronic components, welding parts or surgical operations. These arms are typically programmed by entering numerical locations into a computer type program or database. The programming can be a tedious especially when the operation is for an artistic operation such as painting a vehicle where programming is best performed by a robotic arm following the motions of an operator.

Typical jointed arms require programming custom coding to operate, or they operate by teaching them: dragging, recording and playback of the path of motion. Articulated devices such as booms for tree trimming operate by sequentially moving each articulated axis until a desired location is reached.

A number of patents and or publications have been made to address these issues. Exemplary examples of patents and or publication that try to address this/these problem(s) are identified and discussed below.

U.S. Pat. No. 8,155,787 issued Apr. 10, 2012 to Gerard Chalubert et al discloses an Intelligent Interface Device for Grasping of an Object By A Manipulating Robot And Method Of Implementing This Device. The robotic arm operates with a touch screen and a camera to allow an operator to view objects from the camera and then instruct the arm to reach and grasp viewed objects. This patent does not operate with a computer mouse where movement of the mouse dictates arm movement.

U.S. Patent publication number 2011/0022229 was published on Jan. 27, 2011 for Bae Sang Jang et al discloses a Master Interface And Driving Method Of Surgical Robot. This publication is for a product that allows a surgeon to perform an operation at a location that is distal from the patient. A surgeon can be positioned at a control station with three screens to view the patient and uses two separate arms to perform surgery on the patient with robotic arms that mimic the motions from the two separate arms. This patent does not operate with a computer mouse where movement of the mouse dictates arm movement.

U.S. Pat. No. 5,784,542 issued on Jul. 21, 1998 to Timothy Ohm et al discloses a Decoupled Six Degree-Of-Freedom Teleoperated Robot System. This patent is for a six-axis force feedback input device comprising an arm with double-jointed, tendon-driven revolute joints, a decoupled tendon-driven wrist, and a base with encoders and motors. The operator must grasp and manipulate the six-axis force feedback input device to control the robot system, this is not the same as using a standard computer mouse to control the motion of the robotic arm.

What is needed is a laser-mouse guided device defines a jointed arm, or 3 degree of freedom articulated device, control system that performs useful work guided by a laser distance meter designed for three-dimensional arm control, or guided by a mouse for two-dimensional and three dimensional arm control. The control system is enabled by an inverse kinematics software module that can be used on a laptop, or desktop computer. Inverse kinematics enables the user to point to a desired location where the jointed arm tip should go, while a computer software module mathematically determines the appropriate arm rotations to move the jointed arm tip to the desired location.

BRIEF SUMMARY OF THE INVENTION

It is an object of the laser-mouse guided device to provide a three-dimensional laser distance meter that is used for pointing or guiding the jointed arm, or any 3 degree of freedom (DOF) articulated device in physical space.

It is an object of the laser-mouse guided device to provide a computer-pointing device such as a mouse is also used to point or guide a representation of the arm in computer space.

It is an object of the laser-mouse guided device to provide a software module that controls 3D pointer I/O, provides a graphical user interface for control, does inverse kinematics calculations, provides motion control to motors, and reads motor position information. The control system software commands the jointed arm end point to go to the pointed or guided position. The computer's USB ports are used for the guided position input, jointed arm angle inputs, and jointed arm motor control. The computer's screen is used as a graphical user's interface that enables the user to visualize the motion without using the actual robotic arm hardware.

It is an object of the laser-mouse guided device to provide a bipolar pulse width modulation signal processing electronics board that enables A DC motor to move with high torque at low speeds.

It is another object of the laser-mouse guided device to have a two-stage DC motor servo amplifier.

It is another object of the laser-mouse guided device to use an encoder counter unit that is used for the laser pointing and robot arm position measurement.

It is another object of the laser-mouse guided device to use a three DOF jointed arm "flexbot" and a "U-bot" that are defined herein is as robot configurations that allows rapid arm motion without the inertia of a motor involved in the arm dynamics. Instead, the motion is transferred through flexible shafts or shafts with multiple universal joints. The encoders on the arm, and at the end of the flexible shaft, measure angular position; however, any three-degree of freedom (DOF) or two DOF jointed arm robot with incremental encoders or other position feedback to measure angular rotations of joints will suffice.

It is another object of the laser-mouse guided device to use a wireless IP camera(s) to be mounted on and/or near jointed arm to monitor the arm progress in close proximity and to provide motion detection to prevent injury of personnel within the reachable boundary of the jointed arm. IP camera image is displayed in a separate window using a browser via a wireless router.

It is still another object of the laser-mouse guided device where the arm is guided to do useful work using three different motion modes within the software graphical user interface: 1) Absolute Position mode 2) Workspace Perimeter mode, 3) Delta Motion mode.

In the absolute position mode the user points to a desired location or destination within the reachable boundary of the jointed arm, the computer moves the end-point to that location in a single step. This mode Laser and Mouse Guided Jointed Arm is useful to relocate the jointed arm quickly to another position, if the particular path to get there is not important.

In the workspace perimeter mode the workspace, such as a square, using multiple points within the reachable boundary of the jointed arm, the jointed arm will move in a pre-determined pattern of motion within the defined perimeter. This mode is useful to do such tasks as welding, or painting without having to teach the jointed arm the pattern of motion by physically moving it and recording its desired path.

In the delta motion mode when the user moves the pointer in a particular direction the jointed arm will move in a small incremental step of a pre-determined direction and size depending on the coordinate frame mode. There are several options of coordinate frame modes such as Cartesian coordinates, polar coordinates, dual axis, and sequential joint trajectory modes etc. The delta motion mode is useful for incrementally following contours of a part.

Various objects, features, aspects, and advantages of the present invention will become more apparent from the following detailed description of preferred embodiments of the invention, along with the accompanying drawings in which like numerals represent like components.

DETAILED DESCRIPTION OF THE INVENTION

Figure 1:
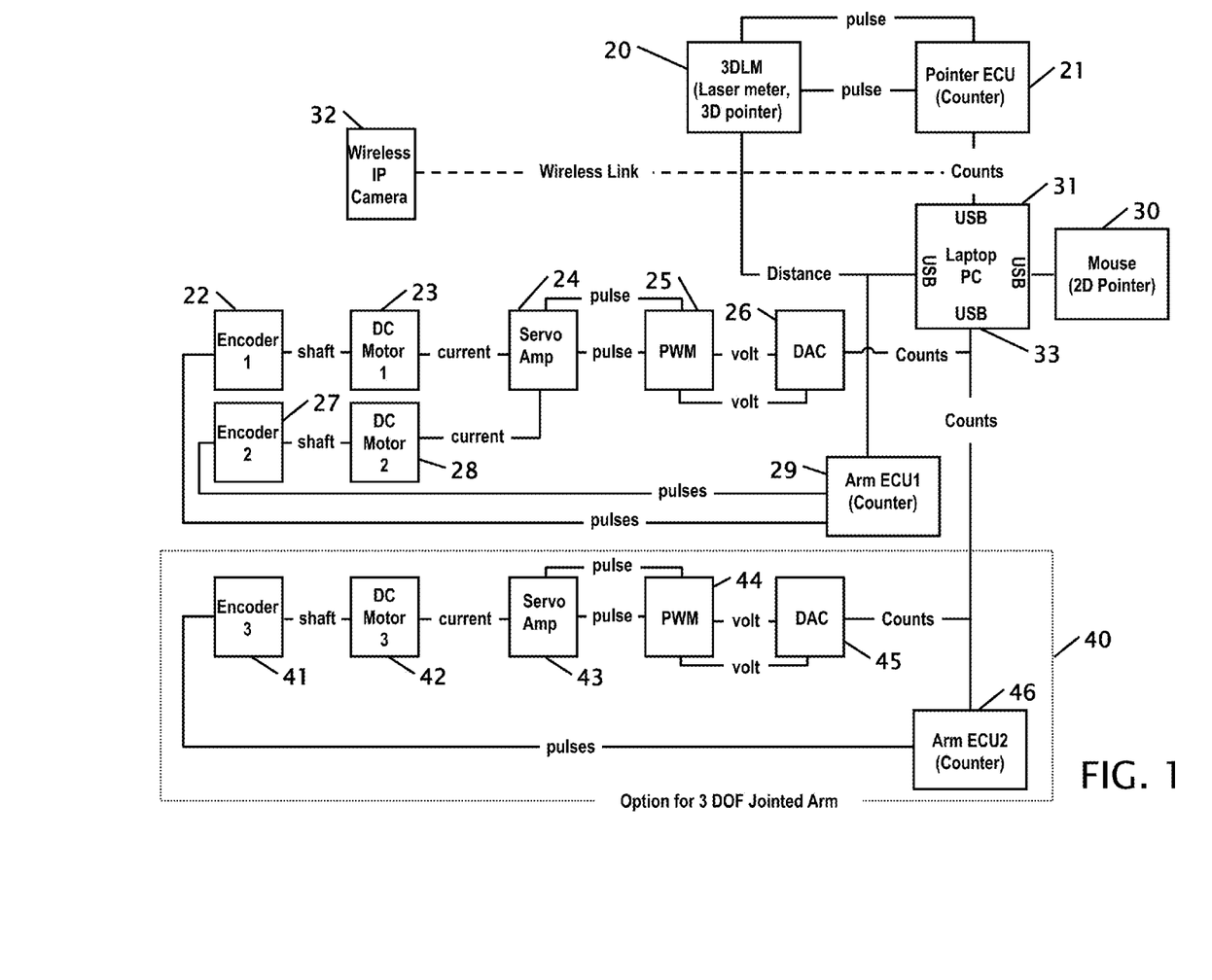
FIG. 1 is an illustration of the laser-mouse guided device.
Figure 3:
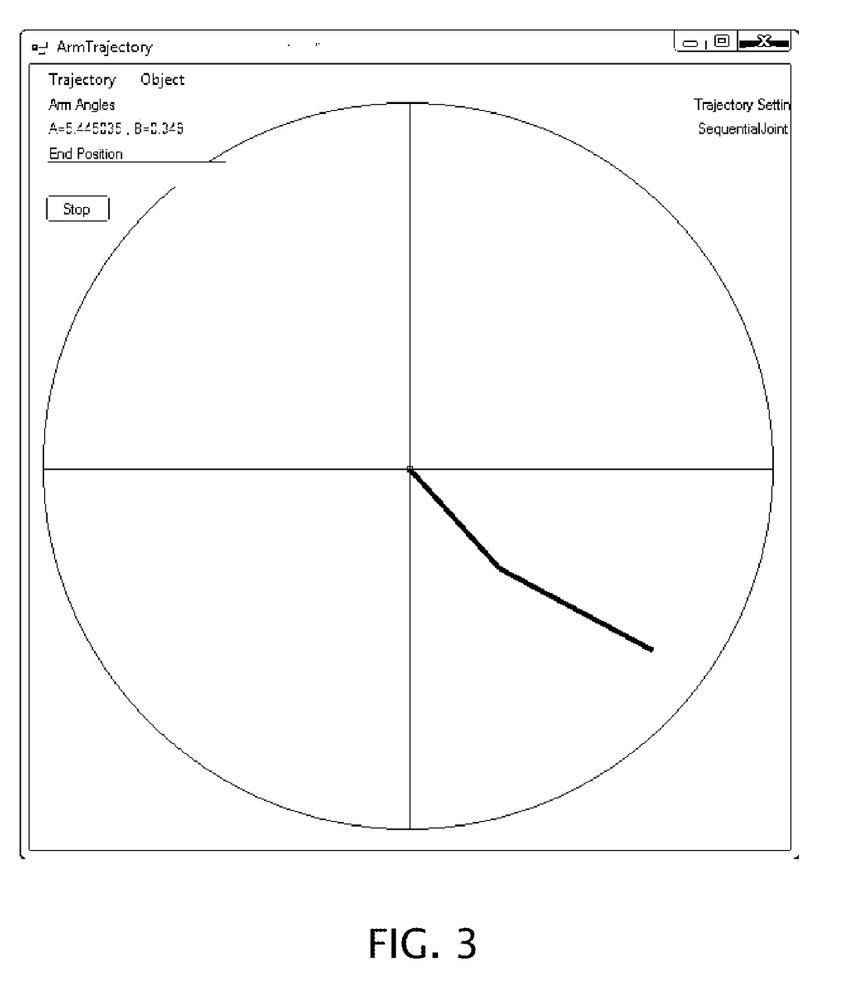
FIG. 3 shows a GUI with a scaled representation of a 2D (planar) robot arm on a computer screen.

FIG. 1, Laser, Mouse guided Jointed Arm Interconnect Diagram. FIG. 3 shows a scaled representation of a 2-D (planar) robot arm on a computer screen. The GUI in FIG. 3 is designed to be used to control of a jointed arm configuration that is similar to a "flexbot" and a "u-bot" depicted in FIG. 6 and described herein. The computer pointers include any device that is customarily used as a pointer on a laptop or desktop computer including a mouse, a touch pad, or trackball, etc. A scaled representation of the arm is displayed on the computer screen 31. The PC 31 display window dimensions are scaled to be the reachable boundary of the jointed arm. The screen's dot pitch and size determines the increments of the mouse pointer on the screen 31 and ultimately the step that the arm is able to move. Given the same dot pitch, a larger window has a higher number of pixels than a smaller window, and thus to improve the arm position accuracy a user must increase the window size. In FIG. 3, the X axis is shown as the horizontal line of the crosshair, and the Y axis is the vertical line of the crosshair.

Figure 4A:
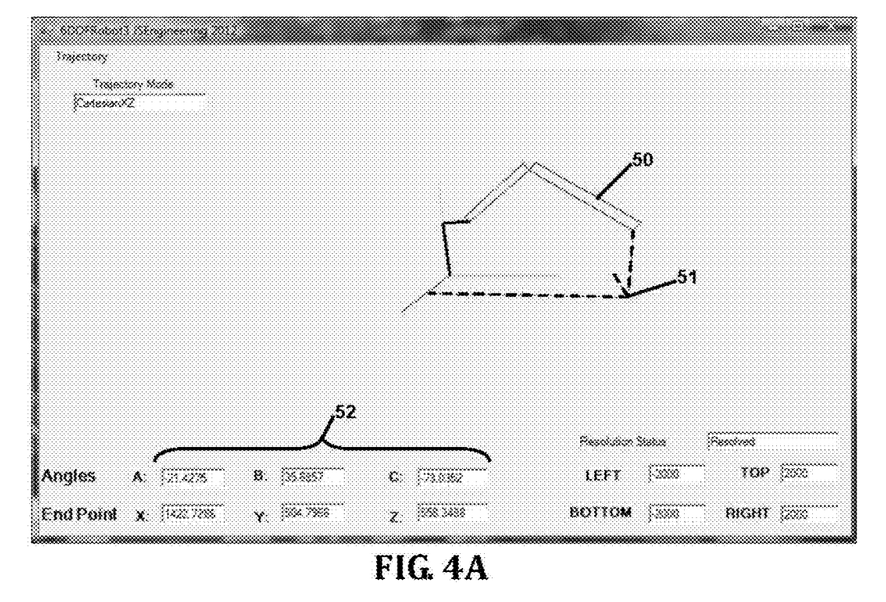
FIG. 4A shows a GUI with a scaled representation of a 3D (wire frame) robot arm on a computer screen.

Both the 2-D (planar) and the 3-D (wire frame) robot models within the software module 31, use the pivot-point and moment-arm geometrical data from a mechanical drawing of an actual robot arm, or other articulated device. FIG. 4 shows a 3-D wire-frame image of the robot displayed as a Graphical User Interface (GUI) on a PC 31. It has three degrees of freedom, and 5 trajectory modes that differ from a teaching pendant. The expected robot end-point location (in mm) is displayed in text boxes 52 on the screen as well as the angular position (degrees) of the jointed-arms.

In the graphical user screen of FIG. 4A, the Y-axis is colored green. The X and Z axes are colored light blue, and dark blue, respectively. The mouse allows the robot to move in two-dimensions at a time (planar motion). In the FIG. 4, the projected square (dashed line) in the X-Z plane shows the restricted motion of the end-point. The robot end point can move perpendicular to the projected square by rotating the mouse wheel in either direction. The laser guided version of the software allows the end-point to move in three-dimensions at a time.

The software default trajectory mode moves the robot end-point using conventional mouse motions like a teaching pendant (moving each joint sequentially) by pressing the mouse left button and sliding the mouse in horizontal and/or vertical direction. The jointed arm end-point moves in planar motion in the following trajectory modes 1) Cartesian X-Y, 2) Cartesian X-Z, 3) Cartesian Y-Z, 4) Polar X-Z, 5) 3DLaser Guided. An operator may move the robot end point perpendicular to the projected plane by rotating the mouse wheel in either direction while GUI is set to either the Cartesian or the polar trajectory modes.

Three Dimensional Laser (Distance) Meter (3DLM) Description.

Figure 4B:
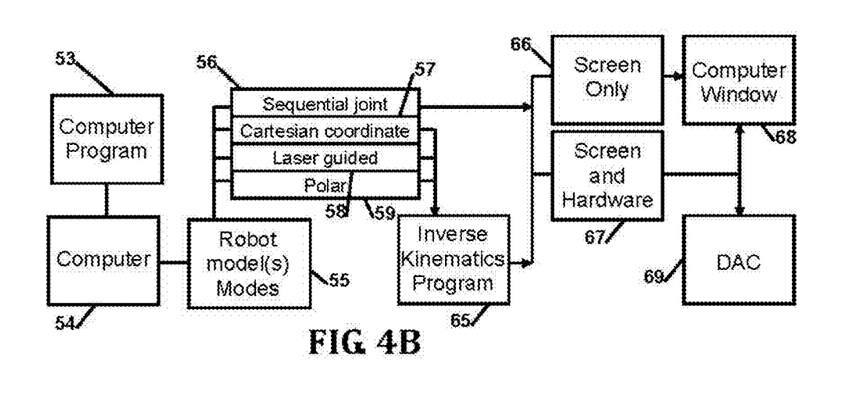
FIG. 4B shows a block diagram of the system blocks.

FIG. 4B shows a block diagram of the system blocks. The system has a computer simulation program 53 operating on a computer 54. The computer 54 runs robot model(s) modes 55 of sequential joint 56, Cartesian coordinate 57, laser guided 58 and polar 59. The Cartesian coordinate 57, laser guided 58 and polar 59 modes run under an inverse Kinematics program 65 to operate a screen only 66 and or a screen and hardware 67. The sequential joint 56 operate a screen only 66 and or a screen and hardware 67. The screen only 66 is shown on a computer window 68, while the screen and hardware 67 operates both the computer window 68 and the DAC 69.

A three dimensional laser distance meter is a device that finds a point in physical space using spherical coordinates. Its purpose is to guide any 3 degrees of freedom (DOF) articulated device such as an articulated sprayer, jointed arm, telescoping boom, an articulated tree trimmer etc. with a laser beam pointed to objects in physical space while the computer controls the articulated device motions using inverse kinematics of its position vector.

A commercially available laser distance meter is mounted into a u-bracket to enable it to tilt up relative a horizontal plane. The u-bracket is able to swivel on its base to enable the laser distance meter to pan around a horizontal plane. The radius, tilt and pan angles define a spherical coordinate system that can be mathematically converted to Cartesian coordinates (x, y, z) of the of 3DLM device. The radial distance, r, is determined by the laser meter distance is input to the computer's USB port. The z Cartesian variable that is measured on an axis perpendicular to the 3DLM horizontal plane is equal to r*sin (tilt angle) where the "tilt angle" is in radians and measured from the horizontal plane of the 3DLM device. The x Cartesian variable is equal to r*cos (tilt angle)*cos (pan angle) where "pan angle" is in radians and is measured from a selected axis on the horizontal plane of the 3DLM device. The y Cartesian variable is equal to r*cos (tilt angle)*sin (pan angle) where the y-axis is selected perpendicular to the x-axis such that it forms a right handed coordinate system.

Figure 2:
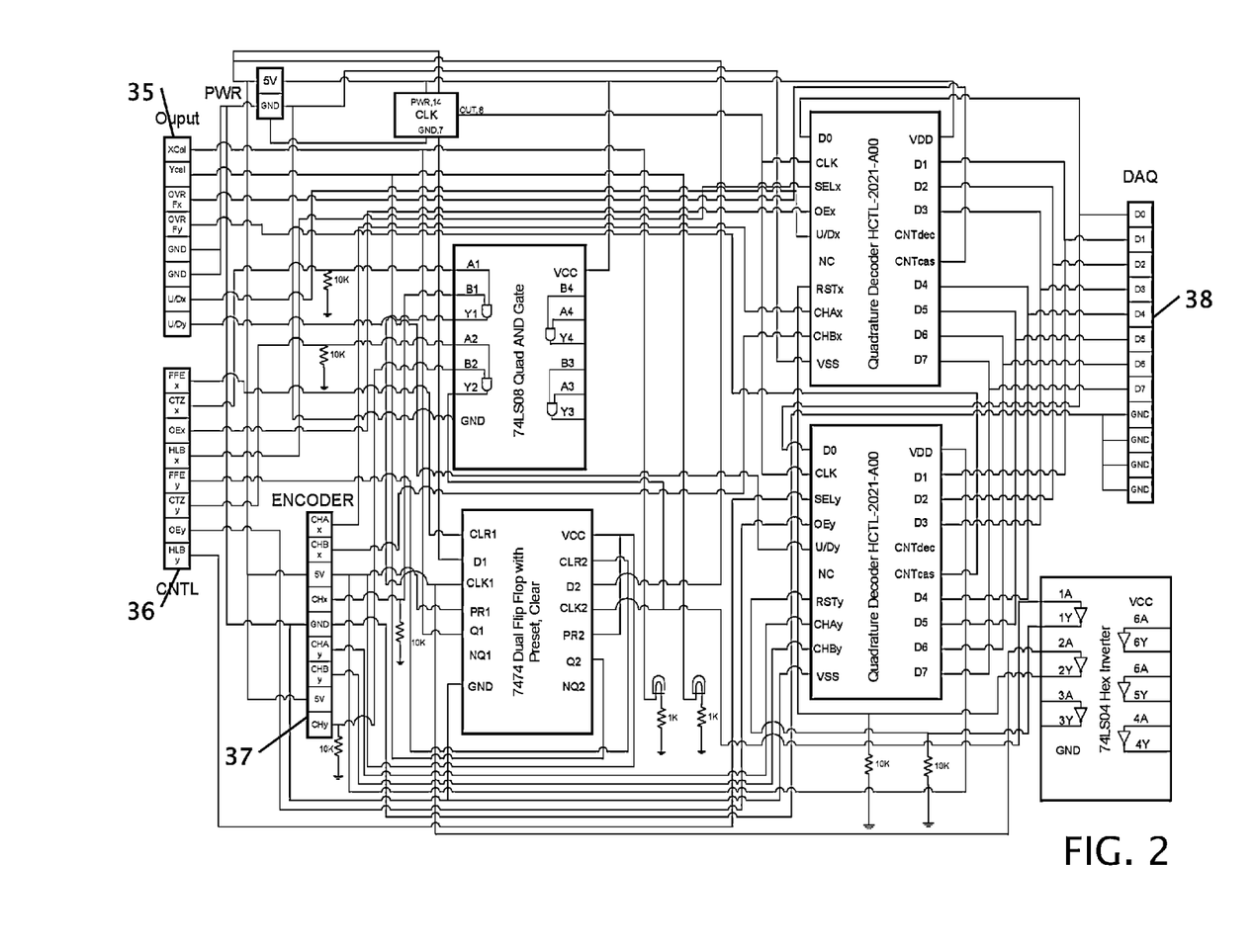
FIG. 2 shows a schematic for the Encoder Counter Unit (ECU).

The Encoder Counter Unit (ECU) 21, 29, 46 measures the pan and tilt angles. The encoder counter 21, 29, 46 provides encoder position data or counts to the computer via the USB port 33. Each ECU 21, 26, 46 handles two separate encoder positions. The 3DLM coordinate frame is related to the jointed arm coordinate frame using 4×4 matrix transformations in the software module. The relation of the 3DLM to the jointed arm base 51 is found by pointing the laser at the robot base and by measuring its coordinates. This relative position is used in the 4×4 matrix mathematical operations (or axis transformations) to relate the 3D pointer to the jointed arm.

Figure 5:
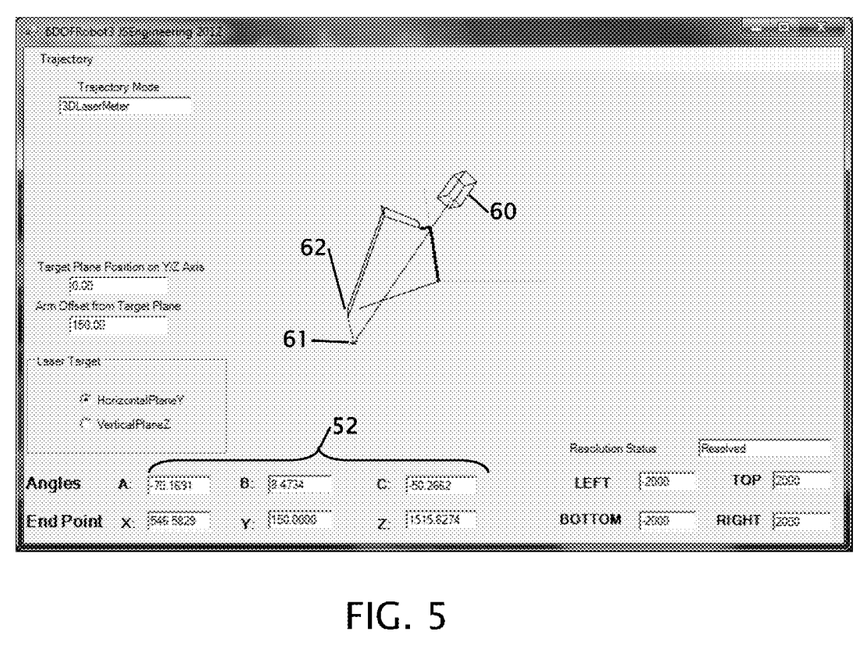
FIG. 5 shows a frame from an animation of the robot arm that is controlled by a laser guided system.

FIG. 5 shows a frame of an animated 3-D robot arm that is controlled by a laser guided pointer system.

User points 3D laser meter 60 to location in physical space 61 within reachable boundary of jointed arm. The pointer creates 3D coordinates of that physical location. Then jointed arm end point (tip) 62 moves to physical coordinates indicated by the pointer. Or user points to boundaries or perimeter of a workspace. The jointed arm or articulated device follows a prescribed pattern of motion to compete a task such as welding or painting within the perimeter. Pointer eliminates programming articulated device for prescribed motion without custom coded software and eliminates need to teach jointed arm by dragging it around, recording the joint motions, then replaying the motions to perform work.

User needs to point to a physical location. A computer does the difficult work of finding the right joint angles to get there.

The 3D laser meter may operate like the mouse as a two-dimensional pointing device by ignoring one of the dimensions from its output. Or it may be operated in three dimensions with an offset in one or more of the dimensions. For example, the laser meter may point to a location on the floor, but the software module can send command positioning to the jointed arm to hover, say, three inches from the floor by adding an offset to the floor position that was measured by the 3D laser meter. The jointed arm then tracks the offset position and avoids contact with the ground.

Alternate Use of 3D Laser Meter as a Survey Tool or Topographical Mapping Device The 3DLM may be used as a surveying device to map any physical object from 3D physical space to 3D computer (digital) space for the purpose of computer modeling, or topographical mapping of an object of interest. This is a separate or distinct function of the 3DLM from the 3D laser meter pointing function.

Encoder Counter Unit (ECU) Description

Referring back to FIG. 1, the ECU's 21, 29, 46 is a circuit board with a, clock, various Boolean logic gates to calibrate the encoders, LEDs, quadrature decoders to count the encoder position, a dual D-Flip-Flop for encoder calibration, and a commercial USB digital I/O module to read the decoder counter information. Each ECU 21, 29, 46 is able to read two separate encoders outputs. The ECU 21, 29, 46 keeps track of the encoder positions independently from the computer.

Encoder Counter Unit Calibration.

FIG. 2 shows a schematic for the Encoder Counter Unit (ECU). The ECU is designed to be used with incremental encoders that have an index or reference pulse to establish an absolute shaft position. The chips and terminal blocks integrated on the ECU board allows two 16 bit quadrature decoders to be addressed, calibrated and sampled from a 8 bit bus using a commercially available 24 bit USB Digital I/O module. The terminal blocks Output 35, CNTL 36, and DAQ 38 are for interface to the 24 bit USB Digital I/O device(s). The ECU ENCODER terminal block 37 is an interface for incremental encoder cables wires. The calibration mode is started with the software module. Calibration must be done after powering cycling the ECU or at power-up. During calibration, the encoder shaft is rotated until the index pulse is triggered.

Computer control bits and Boolean logic gates enable the index pulse event to be stored into a D-Flip-Flop memory chip. While in the calibration mode, LEDs on the circuit board illuminate when the index pulse has been detected. The LEDs provide the user with a visible verification of the calibration event. The computer periodically checks the D-Flip-Flop for index status. When the index pulse occurs, other Boolean logic gates reset the quadrature decoder's counter to zero. When the quadrature decoder is reset, the LEDs lights are turned off. The elapsed time between events is enough for the user to see the LED illuminate when the index pulse is detected and to see it extinguished when the decoder is reset. The software module graphic user interface will display the encoder as calibrated and display the current encoder count. The encoder is then ready to use. The Pointer ECU and Arm ECU counters must be calibrated before use. The calibration procedure is done manually for the 3D laser meter; however it is automated for the jointed arm encoders. The motors are used to rotate the encoder shaft until the index markers are found. At shut down, the arm is returned to a start-up position such that the index marker can be easily located during the calibration procedure.

Jointed Arm Motion Control Subsystem Description

The jointed arm motion is caused by the angle error between the commanded position as generated by the graphical user interface and the feedback position as measured by the ECUs.

Once calibrated, the jointed arm position is read from the Arm ECUs 29 and 46. For the 2D mouse guided mode, the user starts with a representation of the jointed arm's configuration on the screen as shown in FIG. 3. The user operates mouse buttons to command the arm to move to a new location on the screen. The software compares the new location to the old position then computes the change in the angular position of the joints to have the jointed arm tip align with the new position. The software generates an angular error that causes the arm motors to operate until the error is reduced to an acceptable range. The motion control scheme uses conventional proportional, integral, and derivative (PID) gains to optimize the motor's response to error commands.

The detailed motion control operations chain is as follows: An error in a joint angle caused counts to be sent to a commercial Digital to Analog Converter (DAC) 26, 45 via the USB interface 33. The DAC 26, 45 converts the counts to analog voltage 26, 45 at the terminal pins. The analog voltage is converted to a bipolar pulse width modulated (PWM) signal 25, 44. The bipolar PWM signals are necessary to allow a DC motor 23, 28, 42 to operate with maximum torque while moving at manageable speeds. At low voltages, DC motors 23, 28, 42 without PWM 25, 44 operate with poor torque. The PWM 25, 44 voltage signal is then amplified by the servo-amplifier 24, 43 and converted to a current large enough to drive a DC motor 23, 28, and 42 to move the jointed arm. When the arm moves, the high-resolution encoder sends pulses to the arm ECU 21, 29, and 46 when jointed arm motion occurs. The arm ECU 21, 29, 46 or increments/decrements it's counter depending on the jointed arm's motion direction. The software module 31, reads the arm ECU at a rate that is compatible with the PC operating system such that it does not become unstable. The software module 31, computes a new angular error then the cycle begins again until an acceptable angular error is achieved.

User Management of Arm Motion Control Through Graphical User Interfaces (GUI)

The object mode selection options determine what the user will be controlling with the mouse. The software has two object modes. The first mode or "screen only" object mode allows the user to simulate the arm motions on the screen and to learn the various motion modes without having the jointed-arm to follow. If the object mode is set to "screen only", a scaled representation of the jointed arm is displayed on the computer screen with a designated color. This color represents the jointed arm commanded position. The computer window field of view is the reachable boundary of the jointed arm. For a two dimensional jointed arm, the representation is shown in two dimensions on the screen. For a three-dimensional jointed arm, a two-dimensional projection of the three-dimensional jointed arm is displayed in the window. The viewpoint of the 2D projection is from the vantage of the 3DLM pointer's location to the jointed arm location. The 2D projection for the computer screen is from 4×4 matrix equations that describe the relation of the 3D laser meter position relative to the jointed arm reference frame. Mouse clicks and/or mouse dragging on the computer screen cause the tip of jointed arm to move immediately to the location selected.

The second mode or "screen and hardware" object mode allows the user to control the jointed arm motions on the screen as a commanded position from mouse or 3D laser pointer, and allows the user and to see jointed arm feedback position as a response. Jointed arm motion occurs in this object mode. The "screen and hardware" mode has additional dialog boxes 52 appear on the screen to as assist in ECU calibration, and to adjust the motor motion control performance parameters such as proportional, integral and derivative gains and voltage offsets; however, each ECU must be calibrated first. Upon completion of the ECU 21, 29, 46 calibrations, another scaled representation of the arm feedback position will be shown on the computer screen using color that is different than the commanded arm position. The distinct color represents the jointed arm feedback position. The software module reads the arm angles from arm ECU counters and then displays the current arm angular orientations. The software attempts to align the commanded position with the feedback position by minimizing the error between the commanded angle on the screen or from the 3D laser meter, and the feedback angle as measured by the arm ECU.

DETAILED DESCRIPTIONS

Pulse Width Modulation Description

The Pulse Width Modulation (PWM) 25, 44 is a device that causes the DC motors 23, 28, 42 to drive at maximum torque even while moving very slowly. The PWM/DC motor combination is preferred over stepper motors because the DC motor 23, 28, 42 has a continuous motion range, whereas the stepper motors move in discrete steps that cause a discontinuous path at the tip of the arm. The PWM is comprised of operational amplifiers and passive components such as resistors, potentiometers, and capacitors. The PWM module has two stages. The first stage is a bipolar triangle wave generator. The second stage is a comparator that compares the input signal to the triangle wave signal. The bipolar triangle wave frequency is adjustable to allow adjustments for the motor response. The frequency is controlled by RC time constants. The time constant is adjusted by tuning a potentiometer in the first stage. Another operational amplifier is a summer to allow a DC bias to be added to the PWM signal to cancel offsets that may be in the input signal. The PWM module handles two separate command signals.

Servo Amplifier Description

The Servo amp 24, 43 is comprised of two stages to create a large current gain for the small currents that are produced in USB based digital to analog converters 26, 45.

1) A pre-amplifier stage that is arranged as a Darlington transistor pair with the second stage, because it shares a common collector with the second stage.

2) The second amplification stage is arranged as a complementary-symmetry pair. Complementary-symmetry pairs use both NPN and PNP transistors to allow a bipolar output signal. The complementary pair has unity feedback gain to reduce the crossover distortion at voltages below 1.2 Volts. Complementary symmetry pairs require dual power supplies to produce a bipolar signal.

3) The servo amplifier requires a complementary-symmetry pair for each Degree of Freedom (DOF) of the jointed arm.

4) Fuses limit amperage output from the servo amplifier to prevent motor over loading, to prevent personnel injury, and to avoid equipment damage.

3D Flexbot Description

Figure 6:
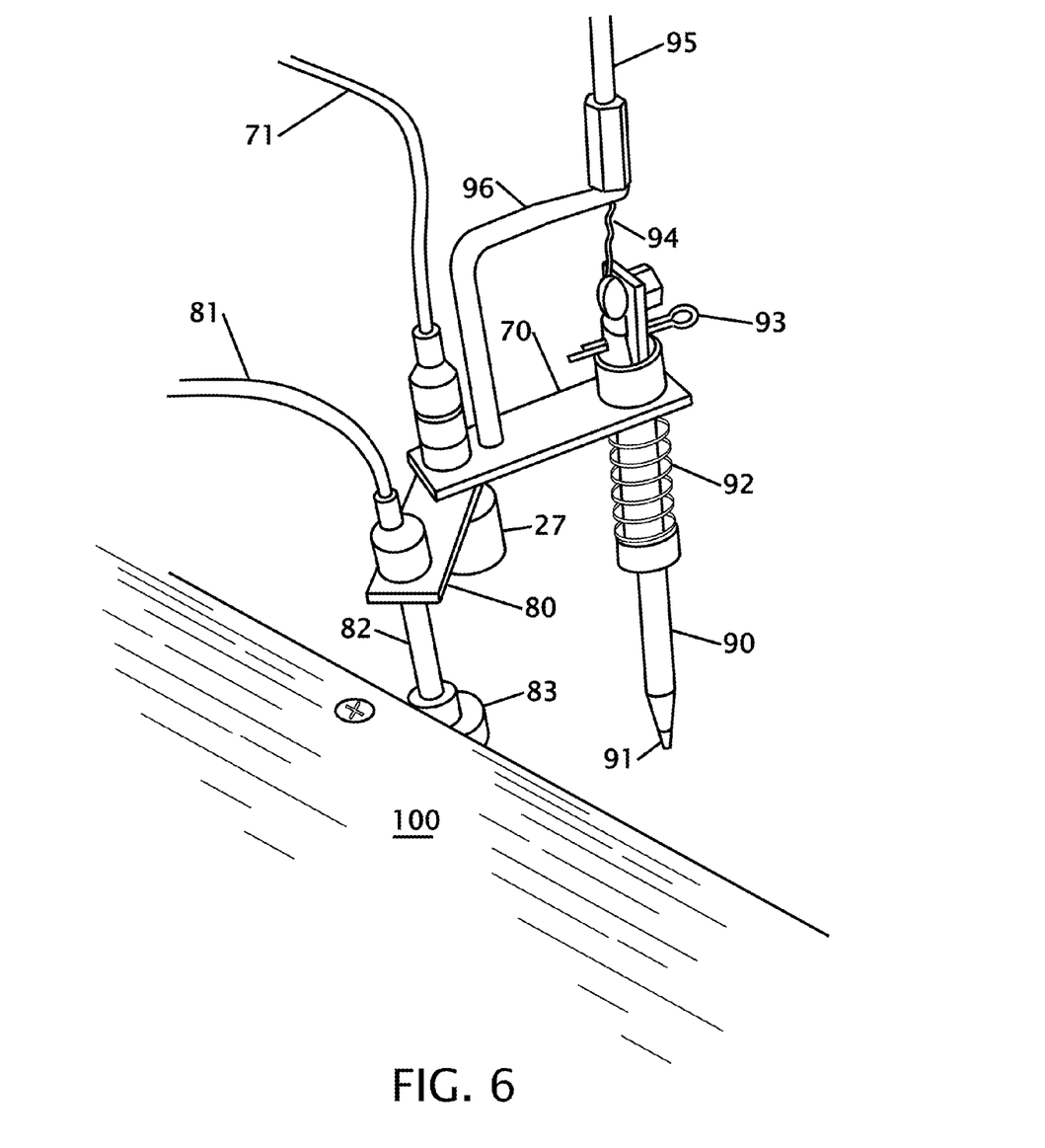
FIG. 6 shows a "flexbot" jointed arm with three degrees of freedom.
Figure 7:
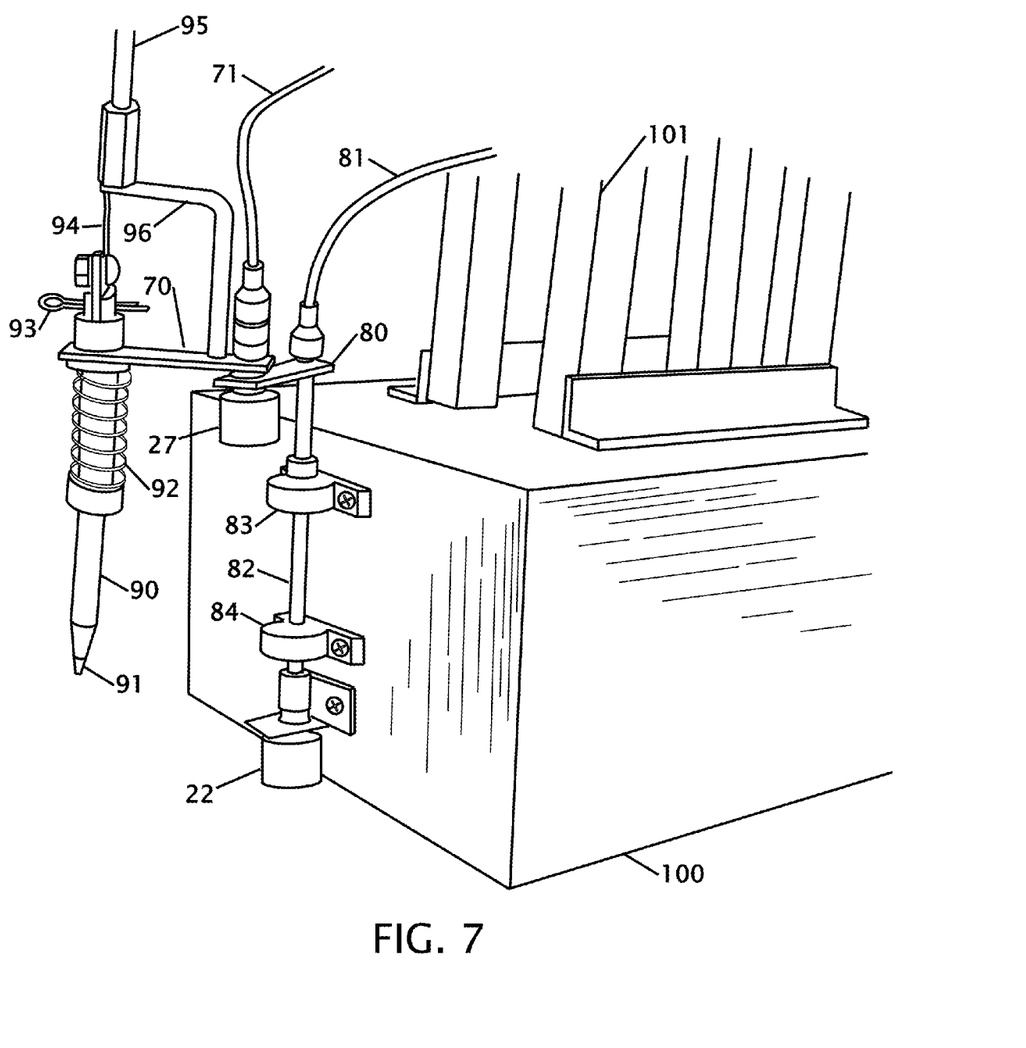
FIG. 7 shows an alternate view of the "flexbot" jointed arm with three degrees of freedom from FIG. 6.

FIG. 6 shows a "flexbot" jointed arm with three degrees of freedom and FIG. 7 shows an alternate view of the "flexbot" jointed arm with three degrees of freedom from FIG. 6.

The arm has two sections: the humerus 80 and the radius 70 section. There are two shafts: the radius shaft 71 and humerus shaft 81. The prime mover are DC motors 23 and 28 (not shown) that are mounted to the base 100 and frame 101 structure that has a radius tower positioned above the humerus tower. This embodiment shows and uses discrete components like conventional motors, pillow blocks 83, 84, flexible shafts 71, 81, 95, encoders 22, 27, rigid shaft 82, arm links, a spring 92 etc. The telescoping boom offers a third DOF. The telescoping boom comprises a support arm 96 with a flexible cable 94 that runs through a hollow flexible support tube 95. Pulling on the opposing (Not shown) end of the cable 94 will overcome the spring 92 force to position the shaft 90 and adjust the height of the end effector 91. A cotter pin 93 allows for quick and simple removal and replacement of the shaft 90 and the end effector 91.

A replaceable end effector 91 to be selected for the particular application such as painting, welding, writing or scripting, cutting etc. The "flexbot" flexible wire shaft and motor configuration is modeled after tendon and muscle functions in a hand or leg. The low inertia arm permits a rapid response while prime mover (the motor or muscle) is removed from dynamics of the motion. The right angle gear motors amplify the motors torque while reducing the shaft speed, and eliminates a twisted shaft from back driving the motor.

3D "U-bot" Description

A "U-bot" is a variation of the "flexbot". It has radius and humerus shafts with 2 or more universal joints (U) to drive the arm, instead of flexible wire shafts. When 2 universal joints are used, the radius shaft components must be selected carefully. Shaft will have three sections: a horizontal shaft that attaches to the radius tower, a vertical shaft the elbow joint of the arm, and a center section that joins the two. Typically, the maximum shaft misalignment for a universal joint is 45 degrees. If more universal joints are used, less shaft misalignment is required per universal joint. For two shafts that are 90 degrees out of alignment a minimum of two universal joints are required to connect them. If two universal joints are used for the shaft design, the radius shaft lengths should be selected such that horizontal shaft protrudes as a short section to avoid being cantilevered. The center section should be the longest length such that it sweeps out a cone with its vertex nearest the horizontal shaft.

The center section inclines from the horizontal shaft at a 45-degree angle. The cone's base radius is same as the path swept by the elbow joint of the robot arm, while at the same time is above the vertical shaft with enough clearance to allow the universal joint to attach to the vertical shaft. The humerus tower shaft is straightforward because both horizontal and vertical shafts are fixed. The universal joints and or flexible shaft is driven by at least one right arm angle motor or a right angle gear box. The "U-bot" permits larger arm lengths and handles higher forces than the "flexbot". Current limiters are used for safety in the servo amps. It is also contemplated to utilize flow sensors in painting operations to control the amount of paint that is being dispensed and to ensure that paint is flowing.

The motion of a 6DOF robot is divided into two modes: 1) the robot "wrist" motion from point to point mode using the robot's base three joints for placement and 2) manipulator motion mode.

The software model includes both the "wrist" point to point motion and the manipulator motion. To engage the manipulator motion, a user selects "Manipulator Motion" within the Trajectory Menu Options. Three text boxes appear to display angles (d, e, f) for the 4th, 5th, and 6th axes of motion. To move the manipulator a user uses the same methods that are used in the "sequential joint" mode. To move the forth axis, an operator can press the left mouse button, then moves the mouse or touch pad horizontally in either direction. To move the fifth axis, the user presses the mouse left button, then moves the mouse or touch pad vertically in either direction. To move the sixth axis, a user presses the mouse right button, then moves the mouse or touch pad vertically in either direction.

Thus, specific embodiments of a laser-mouse guided device have been disclosed. It should be apparent, however, to those skilled in the art that many more modifications besides those described are possible without departing from the inventive concepts herein. The inventive subject matter, therefore, is not to be restricted except in the spirit of the appended claims.

The invention claimed is:

1. A laser-mouse guided device comprising:
   a robot mechanism having at least a humerus and a radius arm;
   said robot mechanism being controlled by a computer having a graphical computer input device of either a mouse or a three dimension laser distance meter control of an end-effector;
   said computer having a graphic user interface with a visual representation of said robot mechanism;
   said computer having a computer simulation program that provides a visualization of motion of said robot mechanism without requiring communication with said robot mechanism or robot mechanism hardware;
   a separately connectable computing system;
   an inverse kinematics program that coordinate robot's end point motion with motion from said graphical computer input device, and
   said inverse kinematics program having operational robot model modes comprising sequential joint, Cartesian coordinate, laser guided and polar whereby real or simulated motion of said robot model modes is calculated and displayed on said graphic user interface to ensure said real or simulated motion is within a reachable boundary of said robot mechanism.

2. The laser-mouse guided device according to claim 1 that further includes at least a third degree of freedom for vertical movement.

3. The laser-mouse guided device according to claim 1 wherein the robot mechanism includes six degrees of freedom.

4. The laser-mouse guided device according to claim 1, wherein said computer performs inverse kinematics calculations to move said robot mechanism.

5. The laser-mouse guided device according to claim 1 wherein said computer includes at least one Universal Serial Bus port for the guided position input, jointed arm angle inputs, and jointed arm motor control.

6. The laser-mouse guided device according to claim 1 further includes a computing system to motor interface.

7. The laser-mouse guided device according to claim 6 wherein said computing system to motor interface includes a motor controller and at least one servo amplifier.

8. The laser-mouse guided device according to claim 7 wherein said servo amplifier is a two-stage DC motor servo amplifier.

9. The laser-mouse guided device according to claim 6 wherein said computing system to motor interface includes at least one digital to analog converter, at least one pulse width modulator.

10. The laser-mouse guided device according to claim 1 wherein each of said at least three degrees of movement includes an encoder.

11. The laser-mouse guided device according to claim 10 wherein said encoder is used with a counter unit that is used for determining a position of said robot mechanism jointed arm.

12. The laser-mouse guided device according to claim 1 that further includes at least one wireless Internet Protocol camera that is mounted on or near said robot mechanism jointed arm.

13. The laser-mouse guided device according to claim 12 wherein an image from said at least one wireless IP camera is viewed on said separate connectable computing system.

14. The laser-mouse guided device according to claim 1 that is operable in at least one of an absolute mode, a workspace perimeter mode, a coordinate frame mode and a delta motion mode.

15. The laser-mouse guided device according to claim 14 wherein said absolute mode uses current and a desired location or destination within a reachable boundary of said robot mechanism, and said separate connectable computing system moves said robot mechanism to said desired location in a single step of movement.

16. The laser-mouse guided device according to claim 14 wherein said workspace perimeter mode uses multiple points within a reachable boundary of said robot mechanism where said robot mechanism moves in a pre-determined pattern of motion within said reachable boundary.

17. The laser-mouse guided device according to claim 14 wherein said delta motion mode moves said robot mechanism in small incremental step of a pre-determined direction and size depending on a said inverse kinematics program within a coordinated frame wherein said coordinate frame mode includes at least one of Cartesian coordinates, polar coordinates, dual axis, and sequential joint trajectory coordinates.

18. The laser-mouse guided device according to claim 1 wherein an endpoint of said end-effector is controlled by a three-dimension laser meter.

19. The laser-mouse guided device according to claim 1 wherein an endpoint of said end-effector is controlled by a two-dimension computer user interface input device.

20. The laser-mouse guided device according to claim 1 wherein said humerus and said radius arm of said robot mechanism is connected to a flexible shaft, or a shaft with at least one universal joint and said shaft is driven by at least one right angle motor or at least one right angle gear box.

* * * * *